US011385846B2

(12) United States Patent
Inoue (10) Patent No.: US 11,385,846 B2
(45) Date of Patent: Jul. 12, 2022

(54) PRINTING SYSTEM, SERVER, AND PRINTING METHOD (71) Applicant: CANON KABUSHIKI KAISHA, Tokyo (JP)

(72) Inventor: Go Inoue, Fujisawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/063,016

(22) Filed: Oct. 5, 2020

(65) Prior Publication Data
US 2021/0132886 A1 May 6, 2021

(30) Foreign Application Priority Data

Oct. 30, 2019 (JP) .............................. JP2019-197649

(51) Int. Cl.
*G06F 3/12* (2006.01)
(52) U.S. Cl.
CPC .......... *G06F 3/1259* (2013.01); *G06F 3/1207* (2013.01); *G06F 3/1268* (2013.01); *G06F 3/1274* (2013.01); *G06F 3/1288* (2013.01)
(58) Field of Classification Search
CPC .... G06F 3/1259; G06F 3/1207; G06F 3/1288; G06F 3/1268; G06F 3/1274
See application file for complete search history.

(56) References Cited

U.S. PATENT DOCUMENTS

| | | | |
|---|---|---|---|
| 8,675,234 B2 | 3/2014 | Sato | |
| 2007/0211287 A1* | 9/2007 | Fujii | ..................... G06F 3/1253 358/1.16 |
| 2010/0333035 A1* | 12/2010 | Yoshida | .............. H04N 1/00424 715/835 |
| 2012/0062936 A1* | 3/2012 | Nakajima | .............. G06F 3/1259 358/1.15 |
| 2014/0016152 A1* | 1/2014 | Onitsuka | .................. H04N 1/21 358/1.13 |
| 2014/0376040 A1* | 12/2014 | Shiratori | ............... G06F 3/1207 358/1.15 |
| 2015/0373118 A1* | 12/2015 | Ganesan | ............... G06F 16/958 358/1.15 |
| 2016/0224279 A1* | 8/2016 | Kim | ....................... H04L 67/10 |
| 2018/0091658 A1* | 3/2018 | Tsunekawa | .......... H04N 1/0044 |
| 2019/0129669 A1* | 5/2019 | Takahashi | .......... H04N 1/00477 |

FOREIGN PATENT DOCUMENTS

JP 2012133489 A 7/2012

* cited by examiner

*Primary Examiner* — Huo Long Chen
(74) *Attorney, Agent, or Firm* — Rossi, Kimms & McDowell LLP (57) ABSTRACT

A printing system is provided. The system comprises a first print service that acquires and stores a print job from a client terminal; a second print service that acquires the print job from the first print service; and an image forming apparatus configured to acquire the print job and perform printing. The first print service, upon receiving a first completion notification indicating that printing has been completed, responds to a query for status from the client terminal with a second completion notification indicating that printing has been completed. The second print service, when having acquired the print job, neither store the print job acquired from the first print service, nor respond to the first print service with the first completion notification, in accordance with the acquisition.

9 Claims, 9 Drawing Sheets

501 {
Operation : Get-Jobs Request
Request Attributes : job-name
      job-id
      requesting-user-name
      copies
      color-mode
Job Description : which-job = false
}

FIG. 5B

502 {
Operation : Get-Jobs Response
Return code : successful-ok
Job Description : job-id=1
      job-name= "job1"
      requesting-user-name = "user1"
      copies=1
      color-mode= "color"
      job-id=2
      job-name= "job2"
      requesting-user-name = "user1"
      copies=2
      color-mode= "monochrome"
      job-id=3
      job-name= "job3"
      requesting-user-name = "user2"
      copies=2
      color-mode= "color"
      job-id=4
      job-name= "job2"
      requesting-user-name = "user1"
      copies=1
      color-mode= "color"
      job-id=5
      job-name= "job5"
      requesting-user-name = "user3"
      copies=1
      color-mode= "color"
}

FIG. 6A

601 {
Operation : Get-Jobs Request
Request Attributes : job-name
　　　　　　　　　　job-id
　　　　　　　　　　requesting-user-name
　　　　　　　　　　copies
　　　　　　　　　　color-mode
Job Description : which-job = true
　　　　　　　　　requesting-user-name = "user1"
}

FIG. 6B

602 {
Operation : Get-Jobs Response
Return code : successful-ok
Job Description : job-id=1
　　　　　　　　　job-name= "job1"
　　　　　　　　　requesting-user-name = "user1"
　　　　　　　　　copies=1
　　　　　　　　　color-mode= "color"
　　　　　　　　　job-id=2
　　　　　　　　　job-name= "job2"
　　　　　　　　　requesting-user-name = "user1"
　　　　　　　　　copies=2
　　　　　　　　　color-mode= "monochrome"
　　　　　　　　　job-id=4
　　　　　　　　　job-name= "job2"
　　　　　　　　　requesting-user-name = "user1"
　　　　　　　　　copies=1
　　　　　　　　　color-mode= "color"
}

FIG. 7A

701 { Operation : Fetch-document Request
Request Attributes : job-id=1

FIG. 7B

702 {
Operation : Fetch-document Response
Return code : successful-ok
Job Description : job-id=1
　　　　　　　　job-name= "job1"
　　　　　　　　requesting-user-name = "user1"
　　　　　　　　copies=1
　　　　　　　　color-mode= "color"
　　　　　　　　finishing-supported=staple
　　　　　　　　print-quality= "draft"
　　　　　　　　number-up=1
Print data : xxxx......

FIG. 8

PRINTING SYSTEM, SERVER, AND PRINTING METHOD

BACKGROUND OF THE INVENTION

Field of the Invention

The present invention relates to a printing system provided by a cloud print service and configured to print documents stored on a network.

Description of the Related Art

In recent years, the use of a cloud print service that submits a print job via cloud to transmit the print job to an image forming apparatus (see Japanese Patent Laid-Open No. 2012-133489, for example), has become widespread. In such a printing system, the administrator first registers an image forming apparatus to a tenant of a cloud print service to which the administrator belongs. The administrator sets which of the users belonging to the tenant are to be allowed to use the image forming apparatus. Here, a "tenant" refers to a service system deployed on the cloud by the user.

A user authorized to use the image forming apparatus submits a print job from the client terminal to the cloud print service. The cloud print service stores the received print job in a storage. The image forming apparatus acquires the print job stored in the cloud print service and performs printing. The method of acquiring print jobs may be either pull-print from, or push-print to, the cloud print service.

Representative examples of cloud print services include, for example, Google Cloud Print, Microsoft Hybrid Cloud Print, Uniflow OnLine, or the like.

On the other hand, a configuration that realizes a more suitable cloud printing environment for users (referred to as CPS collaboration) by conducting collaboration of a plurality of cloud print services (hereinafter expressed as CPS) is also contemplated. The aforementioned configuration conducts collaboration between a CPS that functions as a provider of print jobs (here, referred to as a first CPS), and a CPS that functions as a recipient of print jobs (here, referred to as a second CPS). The second CPS acquires a print job stored in the first CPS and stores the acquired print job in a storage of the second CPS. The image forming apparatus under control of the second CPS is required to support only the communication protocol with respect to the second CPS, and need not support the communication protocol of the first CPS. Therefore, it is possible to lower the hurdle for introducing an image forming apparatus.

SUMMARY OF THE INVENTION

In a printing system using collaboration of cloud print services, it has been difficult to realize both monitoring of correct status of print jobs and effective use of resources.

An aspect of the present invention is to realize both monitoring of the correct status of print jobs and effective use of the resources in the printing system using collaboration of cloud print services. In addition, another aspect of the present invention increases user convenience in a printing system that conducts collaboration of a plurality of cloud print services.

The present invention is configured as follows. Specifically, according to a first aspect thereof, there is provided a printing system comprising: a first print service that acquires and stores a print job from a client terminal; a second print service that acquires the print job from the first print service; and an image forming apparatus configured to acquire the print job from the second print service and perform printing, wherein the first print service, upon receiving, via the second print service, a first completion notification indicating that printing based on the print job has been completed by the image forming apparatus, responds to a query for status from the client terminal with a second completion notification indicating that printing has been completed, and the second print service, when having acquired the print job from the first print service, neither store the print job acquired from the first print service in a predetermined storage area for storing a print job received from a client corresponding to the second print service, nor respond to the first print service with the first completion notification, in accordance with the acquisition.

In addition, according to a second aspect, there is provided a server, comprising: at least one memory that stores a set of instructions; and at least one processor that executes the instructions, the instructions, when executed, causing the server to perform operations comprising: upon receiving a print job from a client corresponding to a print service provided by the server, storing the print job in a predetermined storage area of the server; in a case where a print job identified based on an acquisition request for a print job from an image forming apparatus is a print job stored in an external cloud print service, acquiring the identified print job from the external cloud print service; in a case where a print job identified based on an acquisition request for a print job from an image forming apparatus is a print job stored in the server, acquiring the print job from the predetermined storage area; transmitting the print job acquired from the predetermined storage area or the external cloud print service to the image forming apparatus; and in a case where a print job identified based on an acquisition request for a print job from an image forming apparatus is a print job stored in the predetermined storage area of the server, transmitting the completion notification to a first information processing apparatus, in accordance with having received a completion notification indicating that printing based on the print job received from the image forming apparatus has been completed, wherein, in a case of acquiring the print job from an external cloud print service, the print job is neither stored in the predetermined storage area nor the completion notification is sent to the external cloud print service, in accordance with the acquisition.

According to an aspect of the present invention, it is possible to realize both monitoring of the correct status of print jobs and effective use of the resources in the printing system using collaboration of cloud print services. In addition, according to an aspect of the present invention, it is possible to increase user convenience in a printing system that conducts collaboration of a plurality of cloud print services.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

When conducting collaboration of CPSs, a scheme such that a second CPS requests a first CPS for a print job, and upon acquiring and storing the print job, the second CPS notifies the first CPS of completion as a job status, is conceivable. For example, the first CPS having received the completion notification erases the print job passed to the second CPS from the storage and sets the status to print-job-completed. Subsequently, when the print job status is queried from a client terminal to the first CPS, the first CPS responds with job completion. Whereas using the aforementioned scheme simplifies job management for each CPS, the print job status notified to the client with respect to a print job which is actually uncompleted may turn out to be job-completed, which may prevent management of correct job status or notification to users.

Therefore, the present embodiment provides a scheme that provides the first CPS with a notification such as "Pending" or "Pending-Held" representing being in storage of the print job, instead of a completion notification, when the second CPS has acquired a print job. The scheme is configured such that the second CPS subsequently passes the print job to the image forming apparatus which in turn executes the print job, and a completion notification is transmitted to the first CPS only when the second CPS has received the completion notification of the print job. The first CPS having received the notification deletes the print job stored therein. The aforementioned configuration allows the client terminal to manage correct job status until printing is actually completed. Furthermore, the present embodiment provides a scheme that prevents a same print job from being stored in both the first CPS and the second CPS, and prevents resources from being doubly consumed from when the second CPS has acquired the print job until printing is completed. In particular, there is provided a scheme that prevents resources from being doubly consumed in each CPS in a cloud system that charges on a pay-per-storage basis. In the following, detailed description will be provided.

Embodiment 1

Network Configuration

Figure 1:
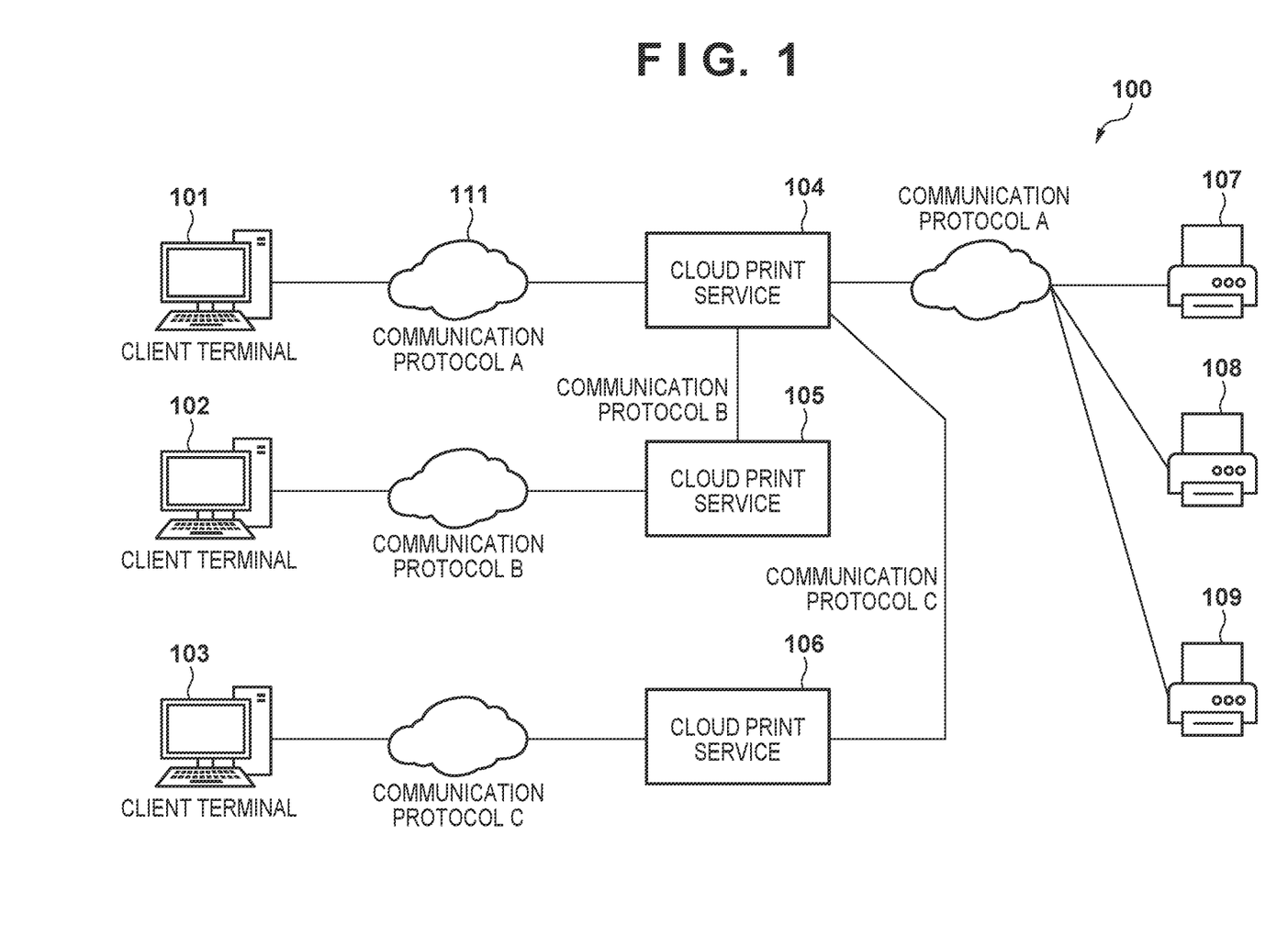
FIG. 1 illustrates an example of a network configuration according to an embodiment.

FIG. 1 is a block diagram illustrating a system configuration in an example of the present invention. Clients 101 to 103 are client terminals that submit print jobs to each cloud print service (hereinafter CPS). A cloud print service (CPS) 104 is a CPS that receives print jobs from the client terminal 101 and also acquires print jobs from external CPSs 105 and 106. Note that cloud print service may also be simply referred to as print service. Alternatively, since the tangible entity of the service as hardware is a server, it may be referred to as a cloud print server, a print server, or a printing server. In the present embodiment, the CPS 104 may be referred to as a first cloud print service (first CPS) or a first print service, a first print server, a first information processing apparatus, or the like. The CPSs 105 and 106 are external CPSs that respectively receive and store print jobs from the client terminal 102 and 103. In the present embodiment, the CPSs 105 and 106 may be collectively referred to as a second cloud print service (second CPS) or a second print service, a second print server, a second information processing apparatus, or the like.

In addition, it is assumed in the present embodiment that the CPS 104 to CPS 106 are different types of cloud print services provided by different service providers. In addition, the CPS 104 to CPS 106 provide a plurality of different tenants with cloud print services. Here, a tenant is a unit of organizations that provide respective services on a cloud platform or manage resources.

Here, the CPS 104 is assumed to provide users belonging to a tenant such as "CompanyA.example0.jp", or "CompanyB.example1.jp" with a cloud print service. In addition, the CPS 105 is assumed to provide users belonging to a tenant such as "CompanyA.example1 jp", or "CompanyB.example1.jp" with a cloud print service. The CPS 106 is assumed to provide users belonging to a tenant such as "CompanyA.example1jp", or "CompanyB.example2.jp" with a cloud print service.

There will be described resource management for each tenant, taking the CPS 104 as an example. The CPS 104 manages user information, job information, printer, or the like, for each tenant. Therefore, a user belonging to the tenant "CompanyA.example0.jp" can use a resource (e.g., printer) managed by the tenant.

However, users belonging to the tenant CompanyA cannot use resources (e.g., printers) managed by a different tenant (e.g., a tenant of a different organization such as CompanyB.example0.jp, etc.) Here, the external CPS 105 and CPS 106 will also be described as managing resources for each tenant, similarly to the CPS 104.

An image forming apparatus 107 is an image forming apparatus configured to acquire a print job from the CPS 104 and execute a printing process. The image forming apparatus 107 may be, for example, a so-called digital multifunction apparatus.

Each component of FIG. 1 is communicatively connected via a network 100. The network 100 is a communication network realized by a communication system such as LAN or WAN, a mobile communication system such as LTE or 5G, or a combination thereof. The network 100 may be of any type provided that it can transmit and receive data.

Hardware Configuration

Figure 2:
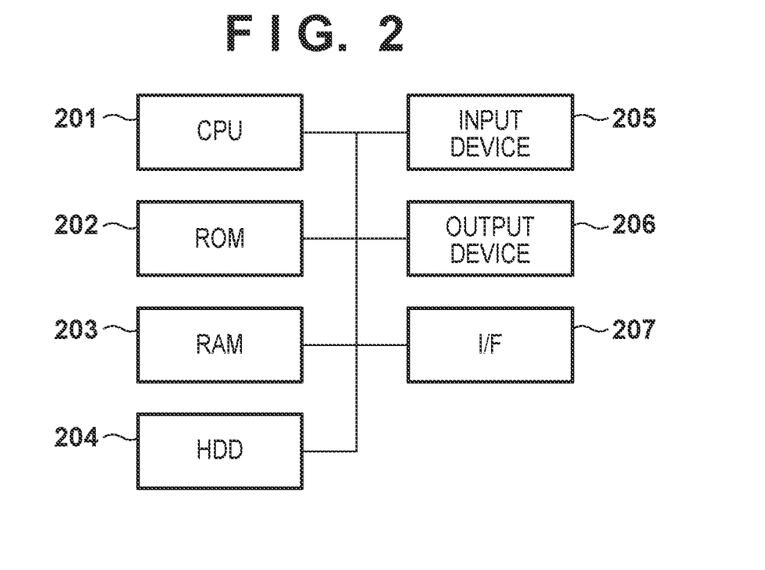
FIG. 2 illustrates an example of a hardware configuration of a cloud print service 104 according to an embodiment.

FIG. 2 is a block diagram illustrating a hardware configuration of an information processing apparatus operating as the CPS 104 of FIG. 1. In FIG. 2, a CPU 201 directly or indirectly controls each device (ROM, RAM, etc.) connected by an internal device, and executes a program for realizing the technique according to the present embodiment. A ROM 202 stores therein BIOS or the like. A RAM (direct storage device) 203 is used as a work area of the CPU 201, or as a primary storage for loading a software module for realizing the technique according to the present embodiment. An HDD (Hard Disk Drive) 204, which is an indirect storage device storing therein base software i.e., the OS, and software modules may be an SSD (solid status drive), or the like. In addition, the HDD 204 has provided therein a predetermined storage area for storing print jobs received from client terminals supported by the CPS 104. An input device (or input unit) 205, including a keyboard, a pointing device, or the like, is a device by which a user provides input. For example, a display is used as an output device (or output unit) 206. In order to provide a graphical user interface (GUI), the input device 205 and the output device 206 may be combined to form a touch panel. An I/F 207 is an interface for connecting to the network.

As has been described above, hardware components such as the CPU 201, the ROM 202, the RAM 203, the HDD 204 or the like form together a so-called computer. Here, the server may further include an ASIC or the like that performs rendering of print data. Although the embodiment 1 exemplifies, for illustrative purposes, a case where a single CPU 201 uses a single memory (RAM 203) to execute respective processes illustrated in the flowchart described below, other aspects may also be conceived. For example, respective processes illustrated in the flowchart described below can also be executed by coordinating a plurality of processors, RAMs, ROMs, and storages. In addition, respective processes can be executed using a plurality of server computers. Here, in order to realize appropriate resource management for a plurality of tenants, techniques such as virtualization or containers may be used as appropriate.

Setting Screen

Figure 3:
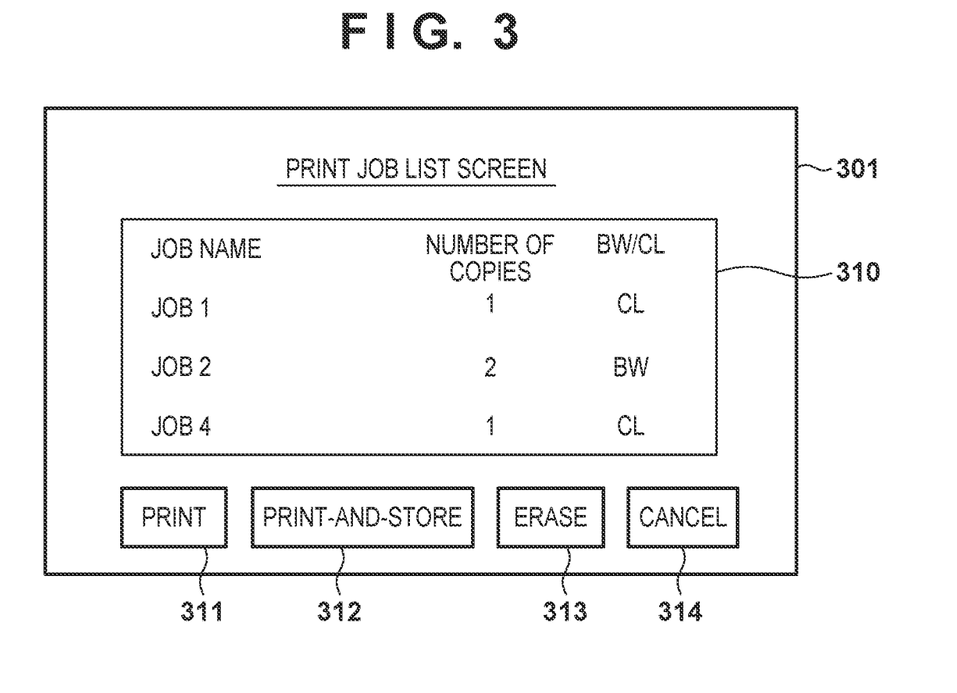
FIG. 3 illustrates an example of an operating unit screen of an image forming apparatus according to an embodiment.

FIG. 3 is an example of an operating unit screen on which a user logs into the image forming apparatus 107 and selects a print job from the CPS to execute printing, according to the present embodiment. The image forming apparatuses 107 to 109 are managed on the basis of user authentication, and require the user to log into the image forming apparatus in order to use the functions of the image forming apparatus such as copying or printing. The user authentication method includes authentication using an ID and a password, authentication using an IC card, a biometric authentication method, or the like. When a user having successfully logged in selects a print function, the image forming apparatus 107 displays a print job list screen 301 for the user as illustrated in FIG. 3. A job list 310 on the screen 301 has listed thereon, for example, job names, number of copies, color setting, or the like, of respective jobs. When the user selects an arbitrary job from the job list 310 of the screen 301 and presses (or touches) a "print" button 311, the image forming apparatus 107 acquires the corresponding print job from the CPS and executes printing. In addition, pressing a "print-and-store" button 312 causes the image forming apparatus 107 to acquire the selected print job from the CPS and execute printing. In this case, the selected print job remains stored in the CPS. Selecting an "erase" button 313 causes the image forming apparatus 107 to transmit a deletion request for the selected print job to the CPS. In response, the CPS deletes the designated job from its storage. In addition, when the user selects a "cancel" button 314 during printing by the image forming apparatus 107, the image forming apparatus 107 terminates the printing process of the print job being performed and cancels execution of the job. The job list 310 acquires and displays a job information list from the CPS to which the image forming apparatus 107 is providing print service.

Print Control by CPS

Figure 4:
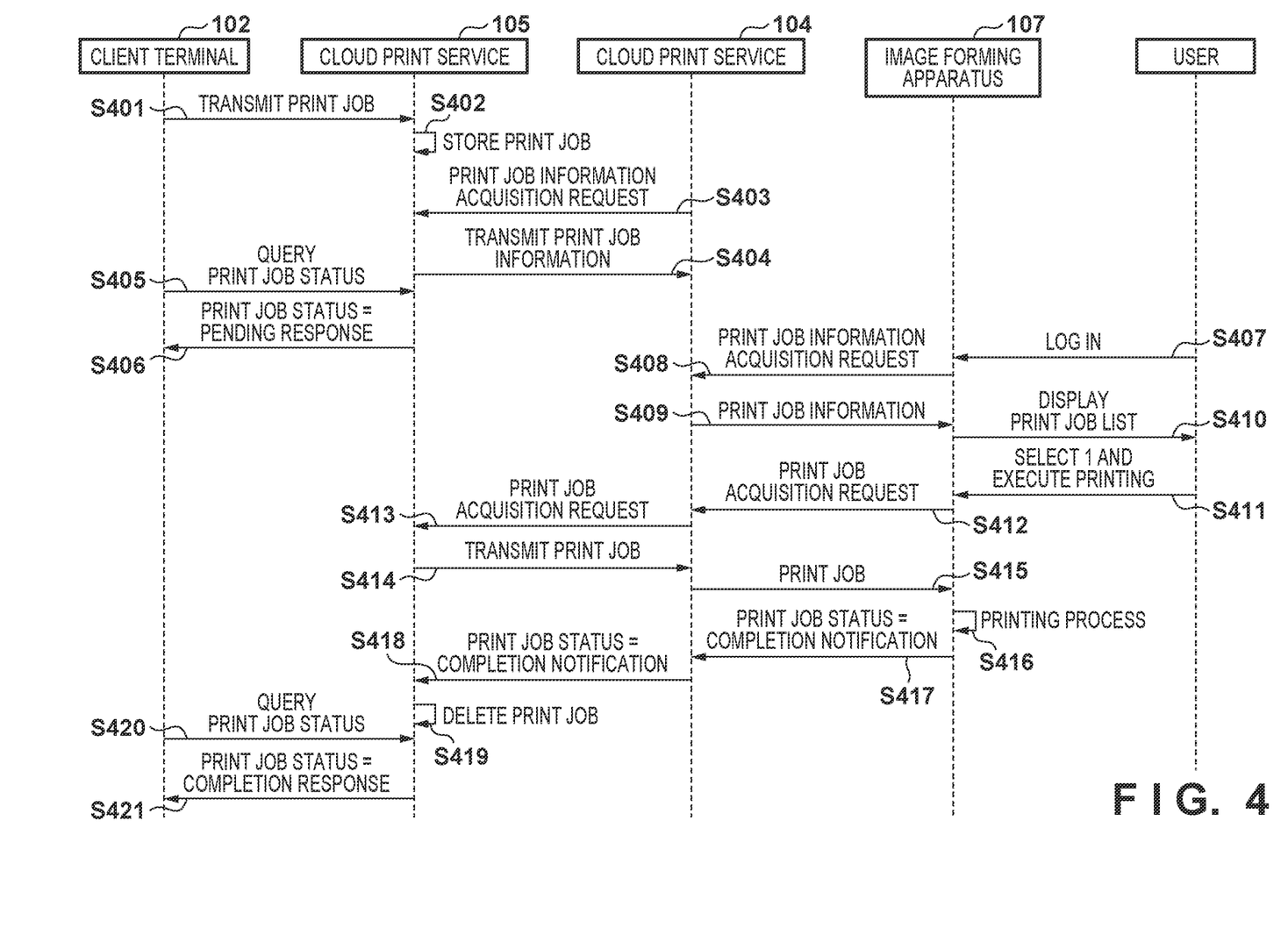
FIG. 4 illustrates an example of a printing sequence according to an embodiment 1.

Referring to FIG. 4, a print control process by the CPS 104 will be described. Here, as an example, the CPS 105 is assumed to be an external CPS, i.e., a first CPS as the counterpart of the CPS 104 which is the second CPS.

The user first submits a print job to the CPS 105 from the client terminal 102 (S401). The CPS 105 having received the print job stores the print job in its storage (S402). On the other hand, the CPS 104 collaborating with the CPS 105 transmits a print job information acquisition request upon detecting that a new job has been stored in the CPS 105 (S403). As a detection method, the CPS 104 may for example transmit the print job information acquisition request to the CPS 105 at a regular time interval, or the CPS 104 may be notified by push notification from the CPS 105. The CPS 105 having received the print job information acquisition request responds with the job information list stored in its storage (S404).

Figure 5A:
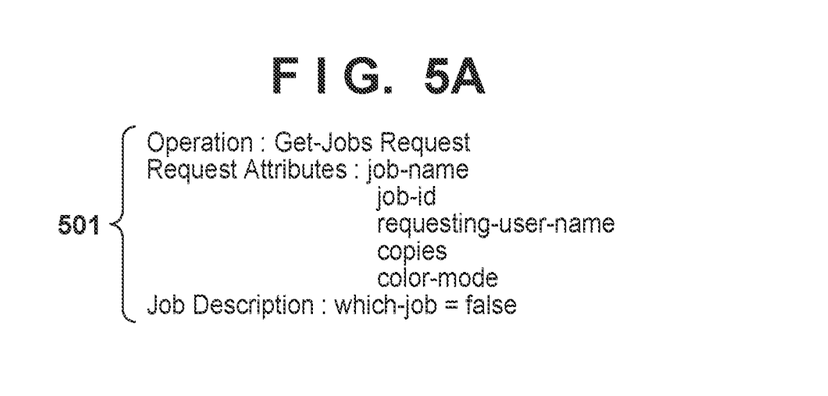
FIG. 5A illustrates a job information acquisition packet example 1 according to the embodiment 1.
Figure 5B:
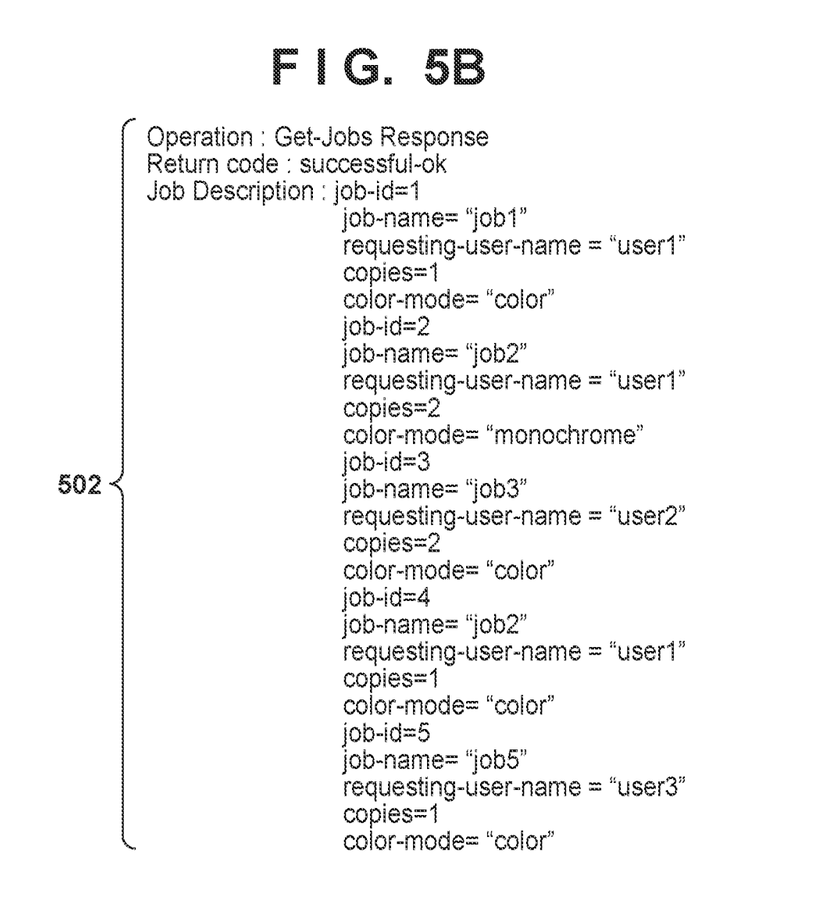
FIG. 5B illustrates a job information acquisition packet example 1 according to the embodiment 1.

FIGS. 5A and 5B are examples of packets of a print job information acquisition request 501 at S403 and a print job information acquisition response 502 at S404, respectively. Although explanation is provided here using IPP as the communication protocol, other protocols may be used. Since the print job information acquisition request 501 intends to acquire the entire job information, a Get-Jobs operation is transmitted including the desired job attribute information with the Which-Job attribute of the IPP attribute being set to False. In addition, a print job information acquisition response 502 turns out to be a response including the requested job attribute information such as ID, name, number of copies, color setting, job owner name, or the like, of each job. In a case where the status of the job submitted by the user is queried (S405) from the client terminal 102 to the CPS 105 at this time point, the designated job of the CPS 105 is stored in the storage of the CPS 105 without being printed yet. Accordingly, a response is returned with Pending or Pending-Held indicating being in storage (S406). The foregoing allows the client terminal 102 to grasp the correct job status.

Subsequently, the user logs into the image forming apparatus 107 in order to execute printing (S407). The image forming apparatus 107 having detected the login transmits, to the CPS 104, a job information acquisition request for the user who has logged in (S408). The CPS 104 having received the job information acquisition request responds with only the job list information of the specified user (S409).

Figure 6A:
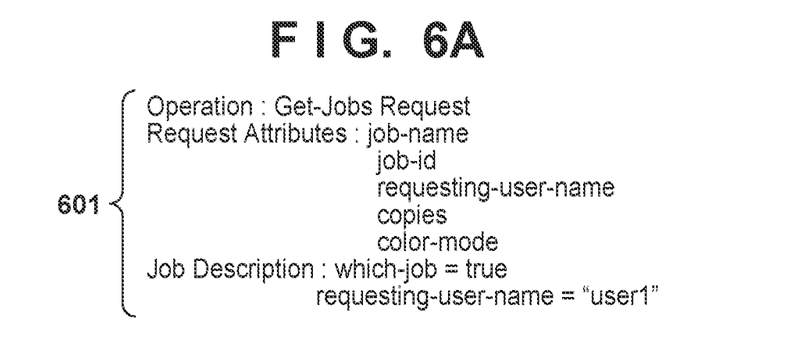
FIG. 6A illustrates a job information acquisition packet example 2 according to the embodiment 1.
Figure 6B:
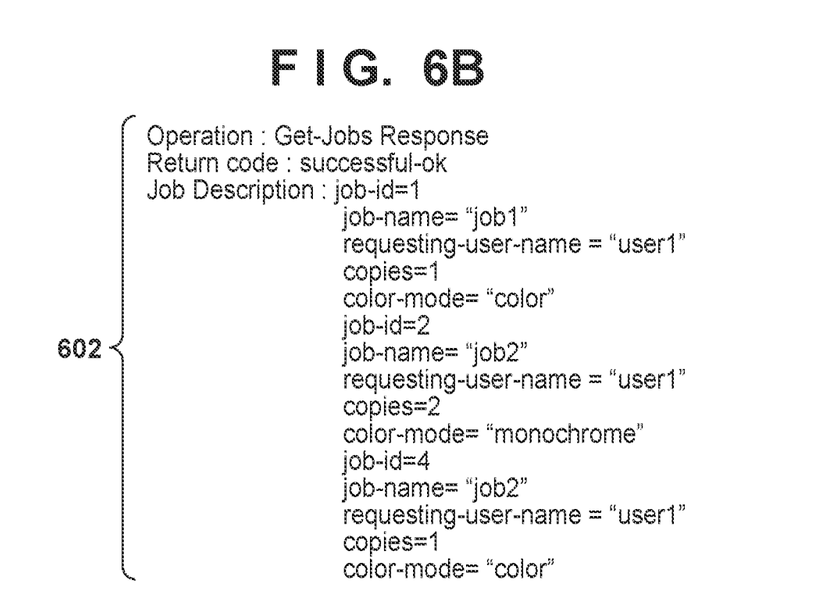
FIG. 6B illustrates a job information acquisition packet example 2 according to the embodiment 1.

FIGS. 6A and 6B are examples of packets of a print job information acquisition request 601 at S408 and a print job information acquisition response 602 at S409, respectively. The image forming apparatus 107 requests only the job information of a particular user being logged in. Therefore, the user name is specified by Requesting-user-name, with the Which-Job attribute being set to True. Here, other attributes may be used provided that the user name can be uniquely identified, such as Requesting-user-uri. Accordingly, the acquired job list information is displayed on the operating unit of the image forming apparatus 107 as illustrated in FIG. 3 (S410).

Figure 7A:
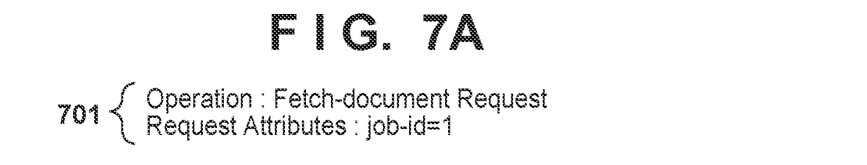
FIG. 7A illustrates a job acquisition packet example according to the embodiment 1.
Figure 7B:
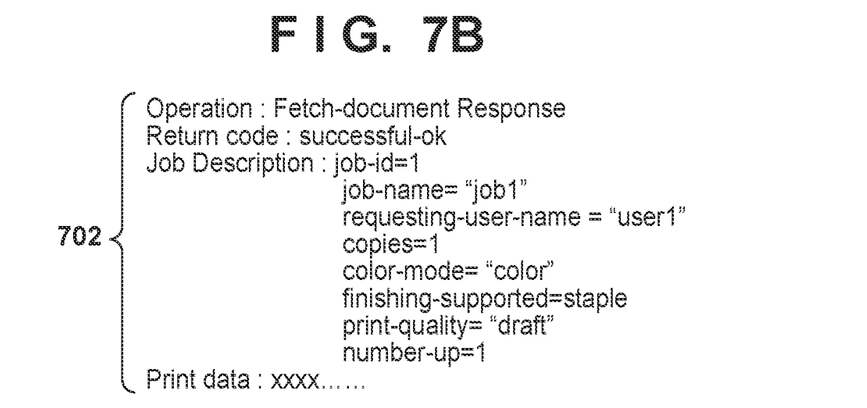
FIG. 7B illustrates a job acquisition packet example according to the embodiment 1.

The user selects, from the job list 310 of FIG. 3, an arbitrary print job intended to be printed (S411). The image forming apparatus 107 transmits a job acquisition request for the selected print job to the CPS 104 (S412). The CPS 104 having received the job acquisition request transmits the job data acquisition request to the collaborating CPS 105 since the storage of the CPS 104 has no print job stored therein (S413). The CPS 105 having received the job data acquisition request transmits the print data stored in the storage of the CPS 105 to the CPS 104 (S414). The CPS 104 having received the print data transfers the received print data as it is to the image forming apparatus 107 (S415). In other words, the print data received from the CPS 105 will never be held in the CPS 104. For the above purpose, it suffices to configure the CPS 104 so as to store print data acquired from a client terminal such as the client terminal 101 without storing print data acquired from another CPS such as the CPS 105. FIGS. 7A and 7B illustrate examples of packets of such print data acquisition requests and transmissions. The job ID and the job name in the job data intended to be acquired are specified in the print data acquisition request 701. The print data acquisition response 702 includes, in addition to the print data, job attribute information related to print setting.

The image forming apparatus 107 having received the print data executes a printing process (S416) and, upon completion of printing, transmits a completion notification to the CPS 104 as the job status (S417). The CPS 104 having received a print status update notification transmits the completion notification as it is to the CPS 105 as the print job status of the job (S418). The CPS 105 having received the completion notification of the print job from the CPS 104 deletes the print job of completed status from the storage of the CPS 105 (S419). Simultaneously, the status of the completed print job is set to "print completed" and stored. Subsequently, transmitting a job status query from the client terminal 102 to the CPS 105 (S420) causes the CPS 105 to transmit a response with job completion for the print job of completed status (S421).

The foregoing allows the client terminal 102 to grasp the correct job status reflecting the actual processing status. Furthermore, print job data is stored only in the storage of the CPS 105, whereby it is possible to reduce storage consumption. As has been described above, in the present embodiment, the CPS 104 does not store print data. For displaying only the print job list on the image forming apparatus 107, only the print job attribute information is required without having to store the print data in the CPS 104.

Process Flow by CPS

Figure 8:
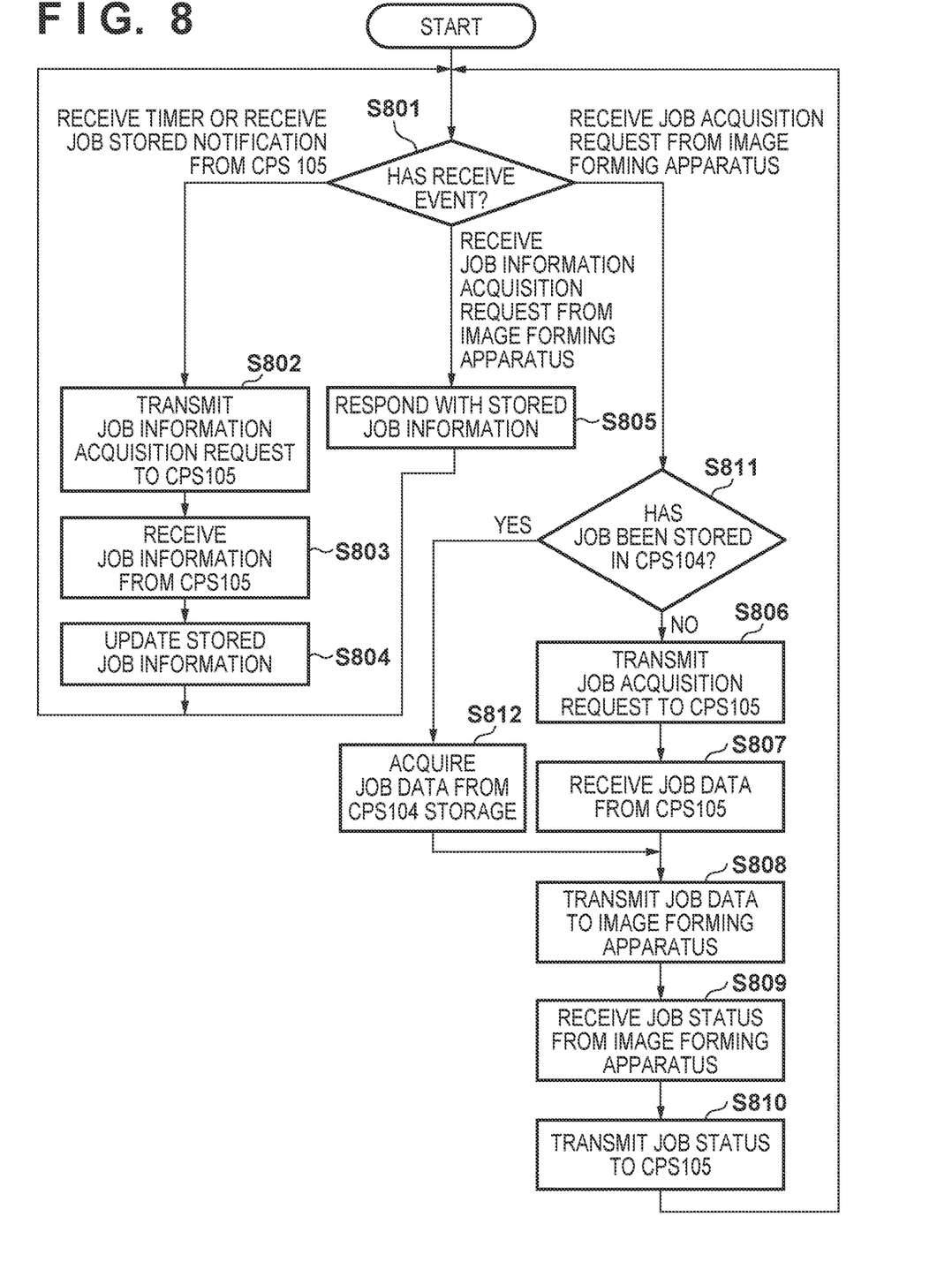
FIG. 8 is a flowchart according to the embodiment 1.

FIG. 8 is a process flowchart to be performed by the CPS 104, i.e., the CPU of the second CPS in the present example. Each of the processes is assumed to be performed for each tenant.

The CPS 104 is in a wait state until initially an event occurs (S801). When, at S801, there occurs a push-notification from the CPS 105 or a timer-set event periodically transmitted to the CPS 105, the CPS 104 transmits a job information acquisition request to the CPS 105 (S802). It is assumed that the request includes information for identifying to which tenant (e.g., CompanyA.example1.jp) the job being requested belongs. Next, upon receiving the job information acquisition response from the CPS 105 (S803), the CPS 104 updates the job information of the corresponding tenant based on the acquired job information (S804). Subsequently, the process enters the event wait state again.

When, at S801, there occurs a receive event of a job information acquisition request from the image forming apparatus 107, the CPS 104 extracts, from the job information held by the CPS 104, the job information required by the user and transmits the extracted information to the image forming apparatus 107 (S805). A more specific description will be given below. The acquisition request includes information specifying a tenant and information identifying a user, and the CPS 104 identifies the tenant based on the information identifying the tenant. Subsequently, the CPS 104 extracts, from the job information managed in association with the identified tenant, only the job information of the user identified based on the information identifying the user, and transmits the extracted information to the image forming apparatus 107.

In addition, when, at S801, there occurs a receive event of a print job acquisition request from the image forming apparatus 107, a determination process is performed at S811. The CPS 104 determines whether or not the job identified based on the receive event of the print job acquisition request is a job stored in the CPS 104. In a case where the identified job is a job stored in the CPS 104, the process flow proceeds to S812, otherwise the process flow proceeds to S806.

First, the processing at S806 will be described. The CPS 104 transmits the print data acquisition request to the CPS 105 (S806). The request includes information identifying a tenant and information identifying a job. Subsequently, the CPS 104 transmits a request for receiving the job identified based on the job-identifying information to the CPS 105, and receives the print data (job data) from the CPS 105 (S807). Subsequently, the CPS 104 transfers the received print data as it is to the image forming apparatus 107 (S808). Subsequently, the CPS 104, upon receiving a job status update notification from the image forming apparatus 107 (S809), transmits the job status update notification to the CPS 105 in the same job status (S810).

On the other hand, at S812, the CPS 104 acquires the print data (job data) corresponding to the request from a predetermined area of the storage (e.g., HDD 204) managed by the CPS 104. Subsequent printing processes are similar to the case where printing data is acquired from the CPS 105, and description thereof will be omitted. Here, it is assumed in the present embodiment that the print data received by the CPS 104 from a client terminal such as a PC or a smartphone is stored in a predetermined area. For such a job stored in the CPS 104 without passing through the CPS 105, the processing at S810 is skipped.

The aforementioned procedure allows the CPS 104 to notify the actual status by transferring the job status received from the image forming apparatus 107 to the client, without holding the print job received from other CPSs in a predetermined area.

Accordingly, it becomes possible to suppress occurrence of a state in which similar print data are kept duplicately stored on a plurality of different services such as the CPS 104 or the CPS 105, thereby allowing for using cloud resources without waste.

Printing Process of Print-and-Store

Next, there will be described a printing process control in the CPS 105 in a case where the user has selected "print-and-store" and executed printing on the operating screen of FIG. 3. "Print-and-store" is an operation that keeps the print job data stored in the storage of the CPS without erasing the print job data from the CPS after completion of printing. Accordingly, the user can keep a frequently-printed document stored in the CPS, thereby saving the trouble of submitting a print job to the CPS each time performing printing.

Figure 9:
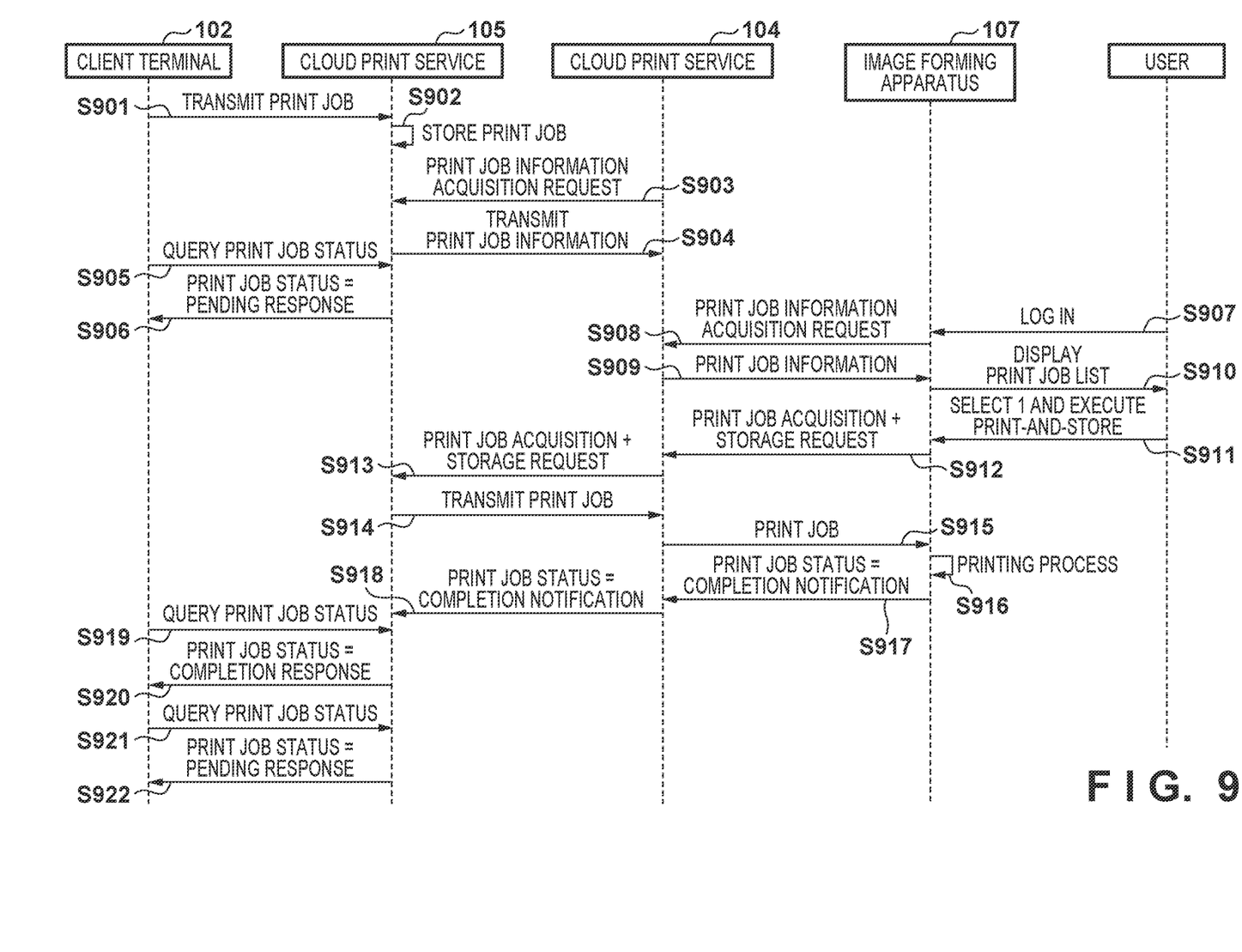
FIG. 9 illustrates a "print-and-store" sequence 1 according to an embodiment 2.

FIG. 9 is a process sequence diagram of a case where an external CPS supports the interface and function of "print-and-store". The processing from S901 to S910 is similar to that from S401 to S410 of the embodiment 1. After S910, the user selects an arbitrary job from the print job list 310 of FIG. 3, and selects the "print-and-store" button 312 (S911). The image forming apparatus 107 then, upon detecting that the "print-and-store" button 312 has been selected, transmits, to the CPS 104, a print data acquisition request and a storage request to keep the print data stored. The CPS 104 having received the print data acquisition request and the storage request similarly transmits a print data acquisition request and a storage request to the CPS 105 (S913). The CPS 105 having received the request transmits the print data to the CPS 104 (S914). Subsequently, upon completion of the print process and having received notification of the job completion status, the CPS 105 (S918) keeps the print job of storage request being stored in the storage of the CPS 105 without erasing it. Although the job of interest is usually erased at this time point, the job is preserved because a storage request for the print job has been received by the "print-and-store" operation. Subsequently, the CPS 105 responds to a job status query from the client terminal with a completion notification (S920). However, with respect to a query after a certain time has elapsed since reception of the completion notification, the CPS 105 responds with a Pending or Held status because the job is kept stored in the storage of the CPS 105 (S922).

The foregoing allows for managing the correct job status also from the client, with the job kept stored in the CPS, even when the image forming apparatus has executed a "print-and-store" operation, and also the cloud storage is consumed by the CPS 105 only.

Embodiment 2

Figure 10:
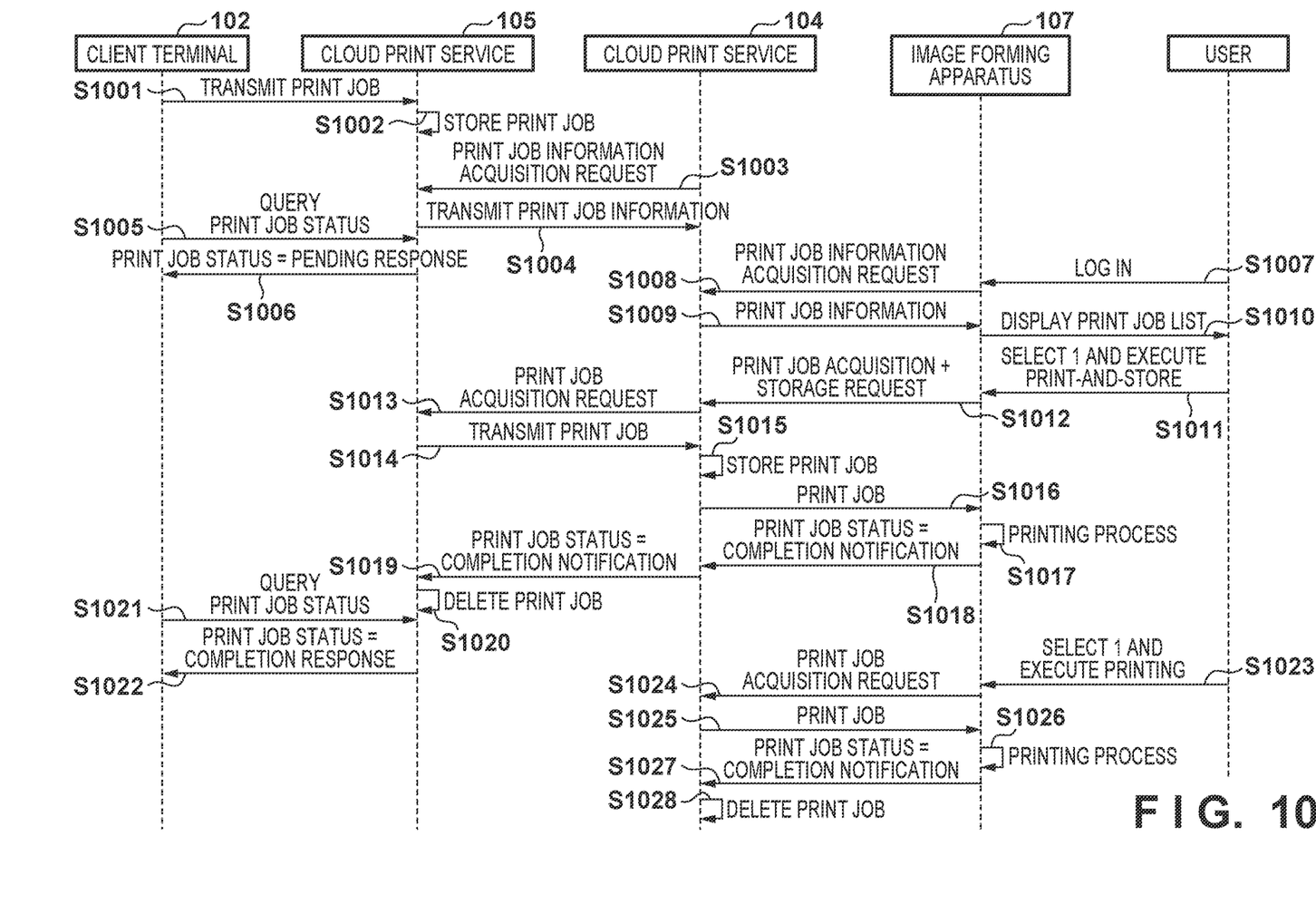
FIG. 10 illustrates a "print-and-store" sequence 2 according to the embodiment 2.

As an embodiment 2, there will be described an example of a case where an external CPS (CPS 105, in the present example) does not support the "print-and-store" interface. Here, description of parts (configuration and processing procedure) common with the embodiment 1 will be omitted. FIG. 10 is a process sequence diagram for a case where an external CPS (CPS 105, in the present example) does not support the "print-and-store" interface. There may also be a case where an interface for "print-and-store" does not exist, depending on the external CPS, in which case the job is intended to be stored in the CPS 104. The processing from S1001 to S1012 is equivalent to that from S901 to S912. When a print job is selected and "print-and-store" is selected, the CPS 104 submits, after S1012, a job acquisition request to the CPS 105 (S1013). The CPS 104 having completed acquisition of the job (S1014) stores the received job in the storage of the CPS 104 (S1015). Subsequently, printing is completed (S1016, S1017) and a completion notification is sent to the CPS 105 (S1018, S1019). In response thereto, the print job is erased from the storage of the CPS 105 (S1020). Since the print job is stored in the storage of the CPS 104, it is possible to transmit (S1025) the job from the storage of the CPS 104 and realize printing (S1026), in a case where a print request for the same job is received again (S1024). When "print" has been selected at S1023, the print job stored in the CPS 104 is deleted S1028 by the CPS 104 after the completion notification has been received (S1027).

According to the aforementioned procedure, it is only after completion of the printing process by the image forming apparatus 107 that a response can be sent to the query for the status of the client terminal 102 with a notification of completion of the printing process. Furthermore, storing the print job by the CPS 104 allows for suppressing consumption of resources for storage. Since jobs are intended to be erased from the storage of the CPS 105, any job status query from a client terminal after a predetermined time has elapsed since completion of printing turns out to be provided with a response that no job exists. However, jobs are stored in the CPS 104 and therefore it is possible to appropriately realize the "print-and-store" function.

Modification Example

Although description has been provided for each of the aforementioned embodiments taking a case where the first CPS (external CPS) is the CPS 105 as an example, the first CPS may be the CPS 106. In addition, the CPS 104, i.e., the second CPS may be configured to collectively handle print jobs and job information supplied from a plurality of different external CPSs and provide the print jobs and job information to the image forming apparatus. In this case, the job information updated from S802 to S804 may be managed with respect to each external CPS. In this case, the CPS 104, upon receiving the job information acquisition request at S805, merges the pieces of job information stored in a plurality of different external CPSs based on the piece of job information stored in each external CPS and notifies the image forming apparatus. In addition, it is assumed that the CPS 104 having received the job acquisition request from the image forming apparatus identifies the external CPS in which the job identified by the job acquisition information is stored, and performs the processing from S806 to S810, communicating with the identified external CPS.

In addition, the timing of merging and updating the job information is not limited to thereto. The CPS 104 may be configured to prepare a single job management DB for each tenant providing the cloud print function, and collectively manage by using these DBs received from a plurality of different external CPSs. In this case, it suffices to update, in the update processing at S804, the job management DB prepared for each tenant based on the job information received at S802 to S803.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-197649, filed Oct. 30, 2019, which is hereby incorporated by reference herein in its entirety.

What is claimed is:

1. A printing system comprising:
a first print service that acquires and stores a print job from a client that supports the first print service;
a second print service different from the first print service, that acquires and stores a print job from a client terminal that supports the second print service, wherein the second print service supports acquiring the print job from the first print service; and
an image forming apparatus that acquires the print job from the second print service and performs printing,
wherein the first print service, upon receiving, via the second print service, a first completion notification indicating that printing based on the print job has been completed by the image forming apparatus, responds to a query of the print job status from the client terminal with a second completion notification indicating that printing has been completed,
wherein the second print service, upon receiving a job notification event from the first print service, obtains bibliography information of the print job stored in the first print service from the first print service, wherein the second print service does not receive print contents that makes up the print job even if the job notification event is received,
wherein the second print service performs acquiring processing to acquire the print job from the first print service and transferring processing to transfer the acquired print job to the image forming apparatus according to receiving a print request for performing the print job corresponding to the bibliographic information, and
wherein, in the transferring processing, neither storing the print job acquired from the first print service into a storage area for temporarily storing the print job until a printing start instruction is received nor responding to the first print service with the first completion notification upon acquisition of the print job is performed.

2. The printing system according to claim 1, wherein the first print service further deletes the print job being stored, in accordance with having received the first completion notification via the second print service.

3. The printing system according to claim 1, wherein the second print service requests the bibliography information of a print job to the first print service, stores the bibliography information received as a response to the request, and upon receiving the request to acquire bibliography information of the print job from the image forming apparatus, transmits the bibliography information of the print job identified based on at least the bibliography information being stored.

4. The printing system according to claim 3, wherein the image forming apparatus further includes a display device,
the image forming apparatus displays a list of print jobs on a user interface, based on the bibliography information received from the first print service and, upon receiving, after a target print job has been selected from the list of print jobs, an operation to print the target print job, transmits the print request for the print job being selected to the second print service, and
the second print service having received the print request transmits the acquisition request for the print job to the first print service.

5. The printing system according to claim 3, wherein the first print service further, when having received, via the second print service, a hold request to keep the storage status of the print job from the image forming apparatus, does not delete the print job which is the target of the hold request, despite having received the second completion notification for the print job which is the target of the hold request.

6. The printing system according to claim 5, wherein the image forming apparatus further includes a display device,
the image forming apparatus displays a list of print jobs for each user on the display device, based on the bibliography information received from the first print service, and upon receiving, after a target print job has been selected from the list of print jobs, an operation to (1) print the target print job and (2) keep the storage status of the target print job, transmits a print and hold request for the print job being selected to the second print service, and
the second print service having received the print request and the hold request for the print job transmits the print request and the hold request for the print job to the first print service.

7. The printing system according to claim 3, wherein the second print service, when having received from the image forming apparatus a hold request to keep the storage status of the print job, further acquires and stores the acquired print job in the predetermined storage area, from the first print service, the print job which is the target of the hold request.

8. The printing system according to claim 7, wherein the image forming apparatus further includes a display device,
the image forming apparatus displays, on the display device, a list of print jobs for each user based on the bibliography information received from the first print service, and upon receiving, after a target print job has been selected from the list of print jobs, an operation to (1) print the target print job and (2) keep the storage status of the target print job, transmits a print request and a hold request for the print job being selected to the second print service, and
the second print service transmits the acquisition request to the first print service, stores the print job received in response to the acquisition request in the predetermined storage area, and transmits a completion request in accordance with completion of storage.

9. A printing method for performing printing via a plurality of print services, the method comprising:
- acquiring and storing, by a first print service, a print job from a client that supports the first print service;
- acquiring and storing, by a second print service different from the first print service, a print job from a client terminal that supports the first print service;
- acquiring, by the second print service, the print job from the first print service;
- acquiring, by an image forming apparatus, the print job from the second print service and performing printing,
- wherein the first print service, upon receiving, via the second print service, a first completion notification indicating that printing based on the print job has been completed by the image forming apparatus, responds to a query of the print job status from the client terminal with a second completion notification indicating that printing has been completed;
- wherein the second print service, upon receiving a job notification event from the first print service, obtains bibliography information of the print job stored in the first print service from the first print service, wherein reception of print contents that makes up the print job is not performed even if the job notification event is received,
- wherein the second print service performs acquiring processing to acquire the print job from the first print service and transferring processing to transfer the acquired print job to the image forming apparatus according to receiving a print request for performing the print job corresponding to the bibliographic information, and
- wherein, in the transferring processing, neither storing the print job acquired from the first print service into a storage area for temporarily storing the print job until a printing start instruction is received nor responding to the first print service with the first completion notification, upon acquisition of the print job is performed.

* * * * *